Jan. 17, 1928. 1,656,561
D. P. HUGHES ET AL
DIRIGIBLE HEADLIGHT
Filed April 28, 1927 3 Sheets-Sheet 1
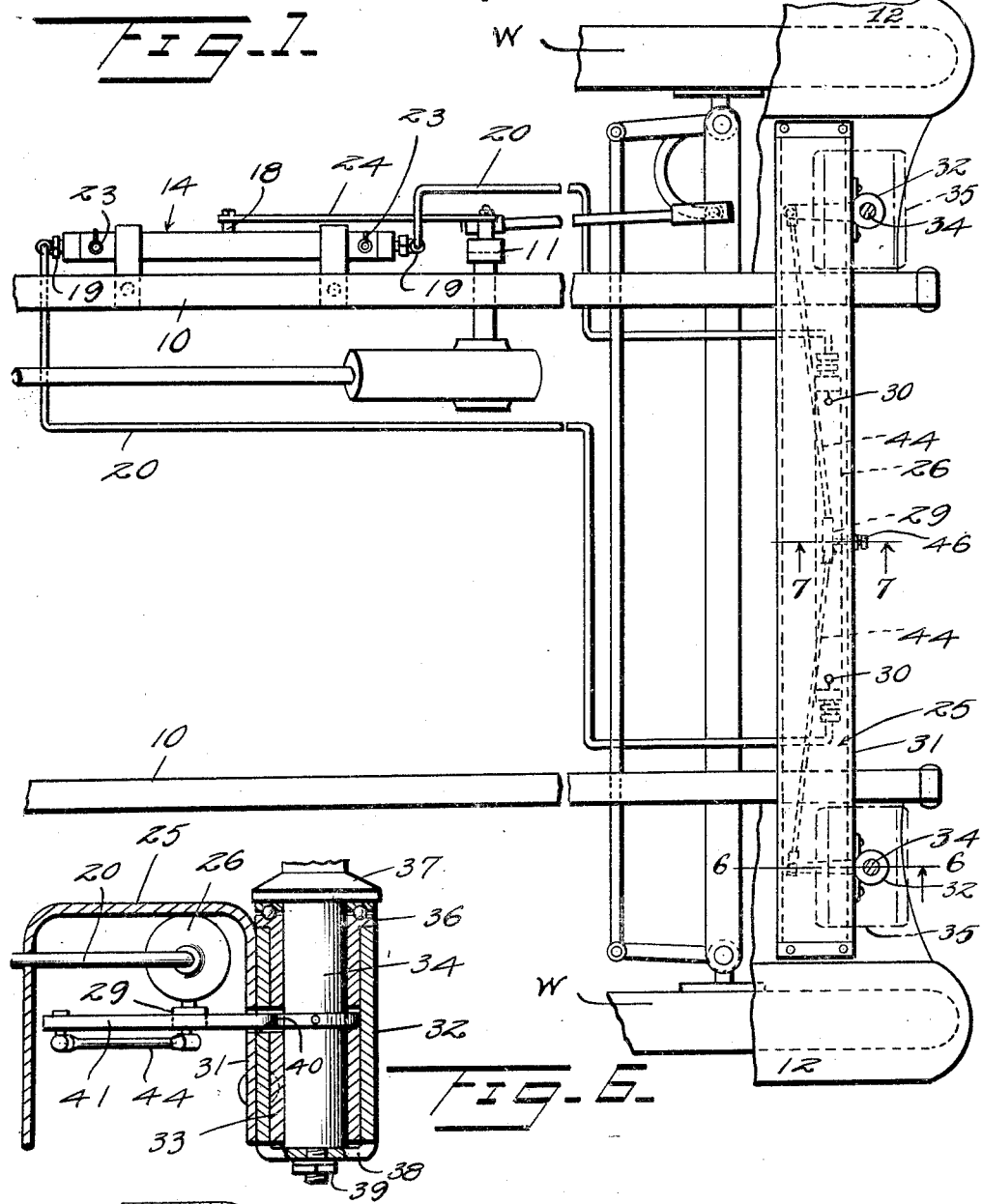
Inventors
D. P. Hughes
P. E. Martin
By Watson E. Coleman
Attorney

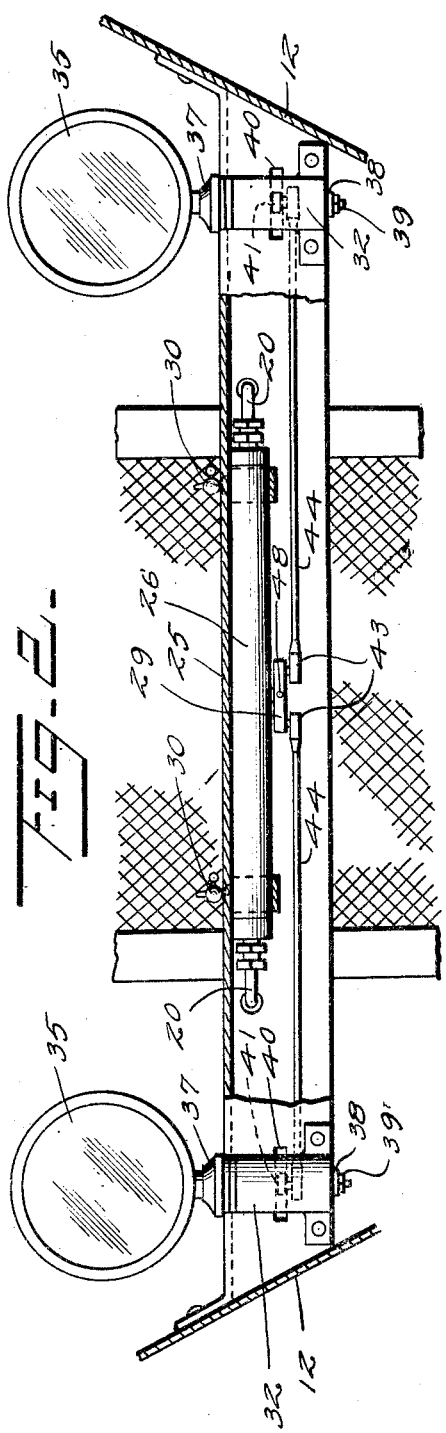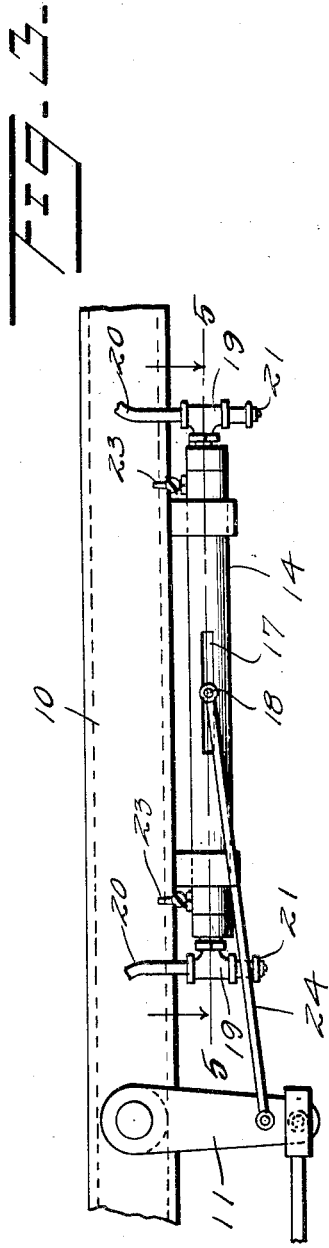

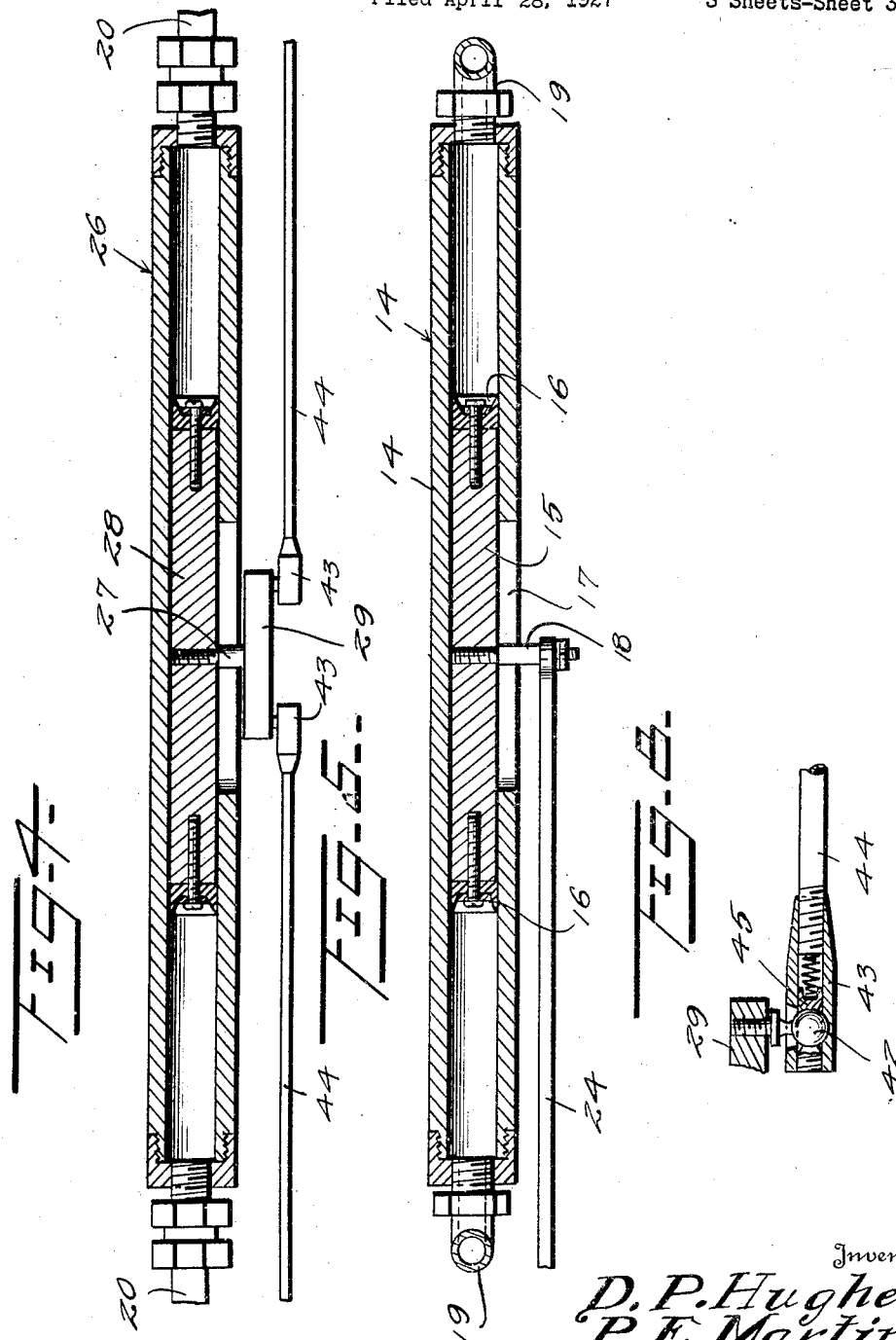

Patented Jan. 17, 1928.

1,656,561

UNITED STATES PATENT OFFICE.

DARIUS P. HUGHES AND PAUL E. MARTIN, OF LINCOLN, NEBRASKA.

DIRIGIBLE HEADLIGHT.

Application filed April 28, 1927. Serial No. 187,340.

This invention relates to dirigible headlights and has for an important object thereof the provision of a novel and improved operating mechanism therefor.

A more specific object of the invention is the provision of hydraulic operating mechanism for maintaining the headlights in alignment with the wheels, of such character that the system may be readily kept filled with the power transmitting liquid and a smooth and uniform operation thereof provided at all times.

A further object of the invention is the provision of means whereby the headlights may be secured in fixed position in event of failure of the operating mechanism.

A still further object of the invention is the provision of a simple and efficient mounting for the headlights which likewise serves to provide a mounting for one of the operating cylinders of the hydraulic mechanism, whereby the headlights are actuated.

These and other objects we attain by the construction shown in the accompanying drawings, wherein for the purpose of illustration is shown a preferred embodiment of our invention and wherein:—

Figure 1 is a plan view showing a vehicle frame and portions of the fenders to which have been applied dirigible headlight mechanism constructed in accordance with our invention;

Figure 2 is a front elevation partially broken showing the operating cylinder and its connections to the headlights;

Figure 3 is an elevation showing the power cylinder and its connection with the steering mechanism;

Figure 4 is a longitudinal sectional view through the power cylinder;

Figure 5 is a section on the line 5—5 of Figure 3;

Figure 6 is a section on the line 6—6 of Figure 1;

Figure 7 is a section on the line 7—7 of Figure 1;

Figure 8 is a detail sectional view through one of the ball and socket connections between the power cylinder and headlight operating arms.

Referring now more particularly to the drawings, the numeral 10 designates the frame of a vehicle, 11 an arm oscillated by the steering mechanism thereof and 12 the ordinary wheel fender of the vehicle. In accordance with our invention, we secure to the frame 10 a cylinder 14, the piston 15 of which is the form of a shaft closely fitting the bore of the cylinder and having at its opposite ends oppositely facing cup leathers 16. The central portion of the cylinder is provided with a longitudinally extending slot 17 and the piston 15 has secured thereto at its center a pin 18 projecting through this slot. Communicating with the ends of the cylinder are T's 19, each having communicating with one branch thereof a conduit 20 and with the opposite branch thereof a check valve inlet 21. Each end of the cylinder has a port opening upwardly through the walls thereof and these ports at their outer ends are closed by pet-cocks 23. The outer end of the pin 18 has connected thereto one end of a pitman or connecting rod 24, the opposite end of which is pivotally connected with the steering arm 11, so that as this steering arm is oscillated, the piston is reciprocated. When the steering arm is at its central position or at that position in which the wheels W of the vehicle are positioned for straight ahead travel, the piston 15 is in its central position.

Secured to the fenders 12 at its ends is a support 25 in the form of an inverted U in cross section. This support has secured within the channel thereof and at its center a second or operating cylinder, generally designated at 26. The operating cylinder is identical in construction and size with the cylinder 14, which will be hereinafter referred to as the power cylinder, and the pin 27 of the piston 28 of this cylinder is directed downwardly and provided with a head 29. The conduits 20 communicate with opposite ends of this cylinder and the ends of the cylinder are provided with bleeding petcocks 30 similar to the pet-cocks 23 of the power cylinder. Secured to the supports and more particularly to the front wall 31 thereof are vertically directed guides 32 interiorly bushed, at 33, to rotatably receive the standards 34 of headlights 35. Thrust bearings 36 between the lamp bases 37 and the upper ends of the guides 32 support the weight of the lamps and any looseness may be taken up by a rod projecting from the lower end of the standards 34 through a transverse brace 38 and having at its lower end a nut 39 adjustable against the lower face of this brace. The wall 31 in alignment with each guide is slotted at 40 and each lamp standard 34 has secured thereto an arm 41 projecting into the channel of the support 25.

The head 29 is provided with ball headed lugs 42, the outer ends of which are received in sockets 43 at the adjacent ends of rods 44, which sockets preferably include a spring-pressed movable wall 45 taking up wear and preventing any rattling or lost motion in operation. The ends of these arms have a similar ball and socket connection with the operating arms 41 of the lamp standards and it will be obvious that as the piston 28 of the operating cylinder moves, this motion will be transmitted to the lamp standards through the rods 44 and arms 41, causing the lamps to oscillate and the beams thereof to remain at the same angle to the frame of the vehicle as the wheels W.

It will be obvious that in operation, assuming the conduits and the ends of the cylinders to be completely filled with fluid, any movement of the steering arm 11 will cause an increase in pressure through one conduit 20 and a decrease in pressure in the opposite conduit 20 in the ends of the operating cylinder, with the result that the piston 28 of the operating cylinder will move synchronously with the piston 15 of the power cylinder. The inlet fittings 21, together with the provision of the pet-cocks 23 and 30, provide a means, whereby these spaces may be at all times kept filled with fluid. This fluid is preferably a light lubricating oil or a mixture of a heavier lubricating oil with alcohol or some similar diluent. In event that due to breakage of the conduit 20 or for any other reason the operating mechanism becomes ineffective, we provide means for locking the piston 28 of the power cylinder in its central position, in which position the headlights will be directed straight ahead in line with the travel of the vehicle when moving straight ahead. This means comprises a screw 46 directed through the forward wall of the support in opposition to the head 29 when the piston is in central position. This screw may be held in adjusted positions by a lock nut 47 and when turned inwardly to its fullest extent, will have its inner end engaged in a socket 48 formed in the head, with the result that this head is held from movement and the headlights may not turn, due to the vibration of the vehicle.

Since the construction hereinbefore set forth is capable of a certain range of change and modification without materially departing from the spirit of the invention, we do not limit ourselves to such specific structure except as hereinafter claimed.

We claim:—

1. In operating mechanism for dirigible headlights, a pair of similar cylinders each having a piston therein, corresponding ends of the cylinders being in communication with one another, a connection between the piston of one cylinder and a reversely movable element of the steering mechanism of the vehicle whereby the piston is reciprocated as the element is reversely moved, connections between the piston of the other of the cylinders and the headlights whereby the headlights are oscillated as said piston is reciprocated, the wall of the last named cylinder having a longitudinally extending slot, a pin extending through said slot and engaged with the piston of the cylinder and having in its outer end a head to which the headlights are operatively connected, a support for said cylinder and means adjustable through the support and engageable in a socket formed in the head of said pin when the piston of the cylinder is in a position where said headlights are directed longitudinally of the vehicle.

2. In operating mechanism for dirigible headlights, a pair of similar cylinders each having a piston therein, corresponding ends of the cylinders being in communication with one another, a connection between the piston of one cylinder and a reversely movable element of the steering mechanism of the vehicle whereby the piston is reciprocated as the element is reversely moved, a housing for the other of the cylinders having means whereby it may be secured to a vehicle to extend transversely thereof, vertically extending guides carried by the housing adjacent opposite ends thereof, headlight standards rotatable in said guides and having arms extended through slots in the wall of the housing to the interior thereof, connections between said arms and the piston of the last named cylinder, and means adjustable through the wall of the housing for locking the piston of the last named cylinder against movement.

3. In operating mechanism for dirigible headlights, a pair of similar cylinders each having a piston therein, corresponding ends of the cylinders being in communication with one another, a connection between the piston of one cylinder and a reversely movable element of the steering mechanism of the vehicle whereby the piston is reciprocated as the element is reversely moved, connections between the piston of the other of the cylinders and the headlights whereby the headlights are oscillated as said piston is reciprocated, means for locking the piston of the last named cylinder in a position where said headlights are positioned to direct the beams thereof in the general direction of the axis of the vehicle to which they are applied, means for introducing fluid to the connections between the cylinders and a pet cock at each end of each cylinder.

In testimony whereof we hereunto affix our signatures.

DARIUS P. HUGHES.
PAUL E. MARTIN.